F. W. JOHNSTONE.
TANK INDICATOR.
APPLICATION FILED JAN. 18, 1915.
1,153,553.
Patented Sept. 14, 1915.
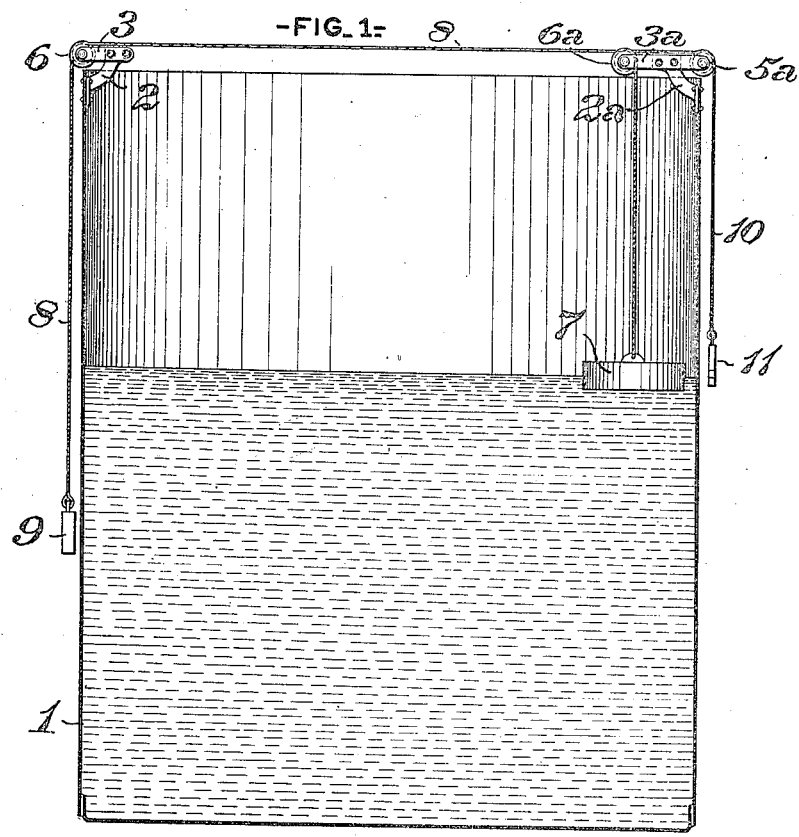
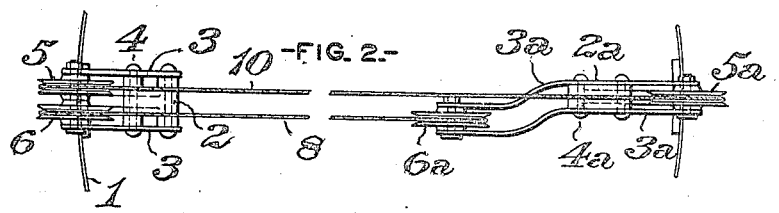
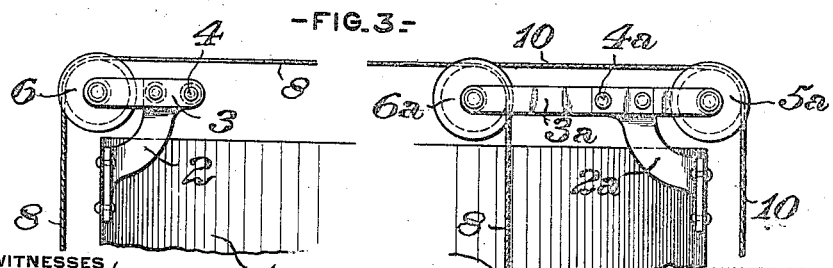
WITNESSES
Edward A. Wright
S. R. Bell
INVENTOR
Francis W. Johnstone

UNITED STATES PATENT OFFICE.

FRANCIS W. JOHNSTONE, OF FORT SMITH, ARKANSAS.

TANK-INDICATOR.

1,153,553.  Specification of Letters Patent.  Patented Sept. 14, 1915.

Application filed January 18, 1915. Serial No. 2,816.

*To all whom it may concern:*

Be it known that I, FRANCIS W. JOHNSTONE, of Fort Smith, in the county of Sebastian and State of Arkansas, have invented a certain new and useful Improvement in Tank-Indicators, of which improvement the following is a specification.

The object of my invention is to provide means, of simple and inexpensive construction and ready application, whereby the rise, fall, and stationary height of the level of the liquid in tanks or reservoirs, particularly those of comparatively large dimensions used for the storage of water and oil, may be accurately indicated to an observer.

The improvement claimed is hereinafter fully set forth.

In the accompanying drawings: Figure 1 is a vertical central section through a liquid storage tank, illustrating an application of my invention; Fig. 2, a partial plan view, on an enlarged scale; and, Fig. 3, a partial vertical central section, on a similar scale.

In the practice of my invention, which is herein exemplified in connection with a cylindrical liquid storage tank, 1, two supporting brackets, 2, 2ª, are secured by bolts or rivets to the tank, adjacent to its top, and substantially diametrically opposite each other. A pair of bearing plates, 3, is secured to the bracket, 2, and a pair of bearing plates, 3ª, of greater length, is secured to the bracket, 2ª. The two pairs of bearing plates are set in line horizontally, and the members of each pair are disposed on opposite sides of the brackets, to which they are connected by bolts or rivets, 4, 4ª, respectively.

Two sheaves, 5 and 6, are journaled horizontally in the bearing plates, 3, adjacent to their outer ends, and two sheaves, 5ª and 6ª, are journaled in the bearing plates, 3ª, adjacent to their outer and to their inner ends, respectively. The journals of all the sheaves are located in the same horizontal plane; the sheaves, 5 and 5ª, are located in the same vertical plane; and the sheaves, 6 and 6ª, are located in a vertical plane parallel with that of the sheaves, 5 and 5ª.

A float, 7, of sufficient buoyancy to be borne upon the surface of the liquid in the storage tank, 1, is located therein, below the sheaves, 6ª, and is connected, by a cord or chain, 8, passing over the sheaves, 6ª and 6, to a counterweight, 9 which is suspended by said cord or chain, on the outside of the tank and below the sheave, 6. The counterweight, 9, is also connected, by a cord or chain, 10, passing over the sheaves, 5ª and 5, to an indicator, 11, which is suspended by said cord or chain, on the outside of the tank, below the sheave, 5ª, and at the same level as the float, 7. The counterweight and indicator are, consequently, located on opposite sides of the axis of the tank, and are adapted to move coincidently in relatively opposite directions, and the float and indicator are adapted to move coincidently in the same direction.

It will be seen that by the above construction, the indicator will stand at the same level as the liquid in the storage tank, and will rise and fall coincidently with the corresponding changes of level of the liquid, as delivered to or withdrawn from the tank, thereby at all times giving a correct indication of said level.

The number of operating parts is minimized, and the appliance is adaptable for use in connection with storage tanks or reservoirs of any desired dimensions, at a comparatively small cost of installation.

I claim as my invention and desire to secure by Letters Patent:

1. The combination, with a liquid storage tank or reservoir, of a float therein, a counterweight and a cord directly connecting said float and counterweight, guide pulleys for said cord mounted on the wall of the tank, a level indicator outside the tank, a second cord directly connecting said indicator and counterweight, and guide pulleys for said second cord also mounted on the wall of the tank.

2. The combination, with a liquid storage tank or reservoir, of a float therein, a counterweight external of the tank, a pair of pulleys mounted on the wall of the tank at diametrically opposite points, a cord passing over said pulleys and connected to said float and counterweight, a level indicator external of the tank on the opposite side from the counterweight, a second pair of pulleys mounted adjacent to said first pair, and an independent cord passing over said second pair of pulleys and connected to said indicator and counterweight.

FRANCIS W. JOHNSTONE.

Witnesses:
　H. H. BURNHAM,
　MAY COLLIER.